April 12, 1927.
G. M. MOSHER
1,624,145
COMBINATION POWER TRANSMISSION DEVICE
Filed Nov. 16, 1925
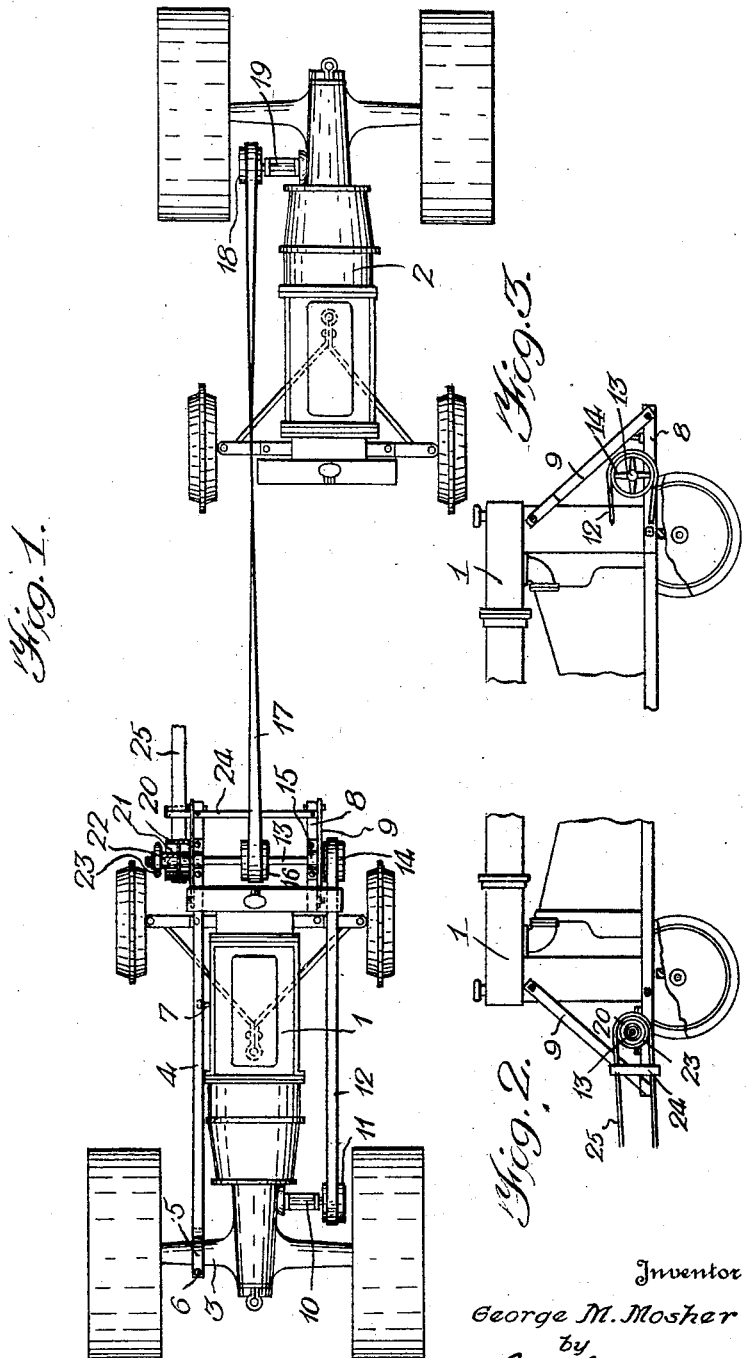
Inventor
George M. Mosher
by
G. C. Kennedy
Attorney Patented Apr. 12, 1927.

1,624,145

UNITED STATES PATENT OFFICE.

GEORGE M. MOSHER, OF JENKINS TOWNSHIP, MITCHELL COUNTY, IOWA.

COMBINATION POWER-TRANSMISSION DEVICE.

Application filed November 16, 1925. Serial No. 69,445.

My invention relates to improvements in combination power transmission devices, and the object of my improvement is to supply a device of this class which is applicable to two or more tractors, and by its construction and mounting relative thereto may be successfully employed in uniting the power of the tractors in a single driving power transmission to any kind of mechanism which requires more than the power of a single tractor to drive it.

This object I have accomplished by the means which are hereinafter described and claimed, and which are illustrated in the accompanying drawing, it being understood that changes in the precise embodiment of invention herein disclosed can be made within the scope of what is claimed without departing from the spirit of the invention.

Figure 1 of the drawing is a top plan view of a pair of like tractors positioned in spaced relation longitudinally, reversed relative to each other and set off somewhat transversely from each other.

Figs. 2 and 3 are respectively opposite side elevations of the front part of that one of said tractors which carries the counter-shaft.

The tractors illustrated are of the "Fordson" type, but it is to be understood that my invention may be used on any other description of tractors or the like using motive power when properly relatively positioned and connected to the moving elements of the device.

As stated the two tractors 1 and 2 are placed in the positions shown, the tractors being anchored effectively. To rigidly bracket my device in front of the tractor 1, I use a short channel bar 8 bolted on one side thereof to project forwardly therefrom, and a longer channel bar 4 on the opposite side bolted thereto at 7 and also having its rear end part medially longitudinally split for a short distance and with the split parts bent to become forks 5 which surround the rear axle 3 and are secured thereto by a bolt 6. The forwardly projecting ends of the bars 8 are supported by braces 9 connected to the opposite upper sides of the tractor radiator.

A counter-shaft 13 is mounted rotatably in bearings 15 on the channel-bars 4 and 8 in front of the radiator to project therebeyond at both ends, and one end carries a pulley 14 which is connected by a driving-belt 12 with a driving-pulley 11 on a shaft 10 on said tractor 1 driven by the motor thereof.

A pulley 16 is secured upon the middle of the shaft 13 for a purpose to be described. Another pulley 20 is mounted non-slidably and loosely upon the other end part of the shaft 13 and has a clutch-hub 21 adapted to be mated with a clutch-sleeve 22 which is splined slidably on the shaft 13 and adjusted by means of a hand-wheel 23 mounted rotatably on said sleeve. The pulley 20 carries a belt 25 under a belt-guide bar 24 which is fastened across the said channel-bars 8, and this belt may be connected to a driven pulley not shown on any description of machinery to be power driven. Any other type of clutch may be used instead.

The other tractor 2 has a like rotary shaft 19 and driving pulley 18, and a cross-belt 17 connects this pulley 18 with the medial pulley 16. When the clutch-sleeve 22 is in mesh, by the power transmission device above described the motive power of both tractors may be united in the driving of machinery by the belt 25. This is especially effective for that purpose, in cases where the driven machine or mechanism requires more driving power than that possessed by a single tractor. Light tractors are coming into common use, and therefore where necessary, two or more such tractors may be coupled by my device to utilize their combined power. The device is simple, inexpensive and easily mounted or demounted. The parts thereof may be changed or rearranged as desired for use on different species of tractors, without departing from my invention.

Having described my invention, what I claim as new and desire to secure by Letters Patent, is:

1. In combination, independent power plants separately mounted for transportation, a driven rotatable shaft mounted on one of said power plants, power transmission devices connected between said power plants and said shaft to rotate it in one direction, and another power transmission device driven by said shaft.

2. In combination, tractors having driving-pulleys, a rotatable counter-shaft mounted on one tractor having an end pulley, a driving belt connecting said end pulley and the driving-pulley on one of the said tractors, a driven pulley disconnectibly mounted on the opposite end of said shaft, said shaft being seated in bearing-boxes adjacent said pulleys, a third pulley secured on said shaft medially between said bearing-boxes, and a cross-belt connecting said third pulley with the driving-pulley on the other tractor.

In testimony whereof I affix my signature.

GEORGE M. MOSHER.